United States Patent [19]

Copeland

[11] Patent Number: 4,968,869
[45] Date of Patent: Nov. 6, 1990

[54] AUTOMOTIVE HEATING AND DEFROSTING APPARATUS

[76] Inventor: Steven R. Copeland, Rte. 1, Box 333, Ore City, Tex. 75683

[21] Appl. No.: 344,355

[22] Filed: Apr. 25, 1989

[51] Int. Cl.⁵ .......................... H05B 1/02; B60H 1/02
[52] U.S. Cl. .................................... 219/202; 98/2.05; 98/121.2; 219/373
[58] Field of Search .............. 219/202, 279, 368, 373; 98/2.08, 2.19, 121.2, 2.05, 2.09, 2.11, 2.13, 121.1; 123/41.12, 41.14, 41.57

[56] References Cited

U.S. PATENT DOCUMENTS

| | | | |
|---|---|---|---|
| 2,117,529 | 5/1938 | Wile et al. | 98/121.2 |
| 3,264,450 | 7/1966 | Wallace. | |
| 3,313,915 | 4/1967 | Chamberlain, Jr. | 219/202 |
| 3,346,007 | 10/1967 | Agnon | 98/121.2 |
| 3,440,398 | 4/1969 | Nilssen | 219/279 |
| 3,461,791 | 8/1969 | Beyer | 98/2.19 |
| 3,469,073 | 9/1969 | Zechin | 219/279 |
| 3,587,442 | 6/1971 | Jakeway | 98/121.2 |
| 4,398,081 | 8/1983 | Moad. | |
| 4,423,307 | 12/1983 | Kondo et al. | 219/202 |
| 4,520,258 | 5/1985 | Grohmann | 219/279 |
| 4,591,691 | 5/1986 | Badali. | |
| 4,621,570 | 11/1986 | Bolton et al. | 98/121.2 |
| 4,678,982 | 7/1987 | Offiler. | |
| 4,700,888 | 10/1987 | Samulak. | |
| 4,723,481 | 2/1988 | Hart et al. | 98/121.2 |

Primary Examiner—A. D. Pellinen
Assistant Examiner—Geoffrey S. Evans
Attorney, Agent, or Firm—Leon Gilden

[57] ABSTRACT

An automotive heating and defrosting apparatus with a replacement or supplemental housing oriented within the passenger compartment of an automobile with a series of pivotally mounted forward louvres and a series of slidably mounted top louvres. The top louvres are arranged to selectively direct heated air through duct work to defrost an associated automotive windshield and the forwardly mounted pivotal louvres are arranged to direct selective heat to the interior passenger compartment. A rearwardly mounted fan and surrounding shroud is oriented rearwardly of the heater housing to direct pressurized air through a series of rearwardly mounted fixed louvres to direct laminae air flow to the interior of the housing. A thermostatic control is arranged to receive circulated water from the engine of the associated automobile to supply current to the fan motor and heating coils of the apparatus until the water attains a predetermined temperature.

5 Claims, 1 Drawing Sheet

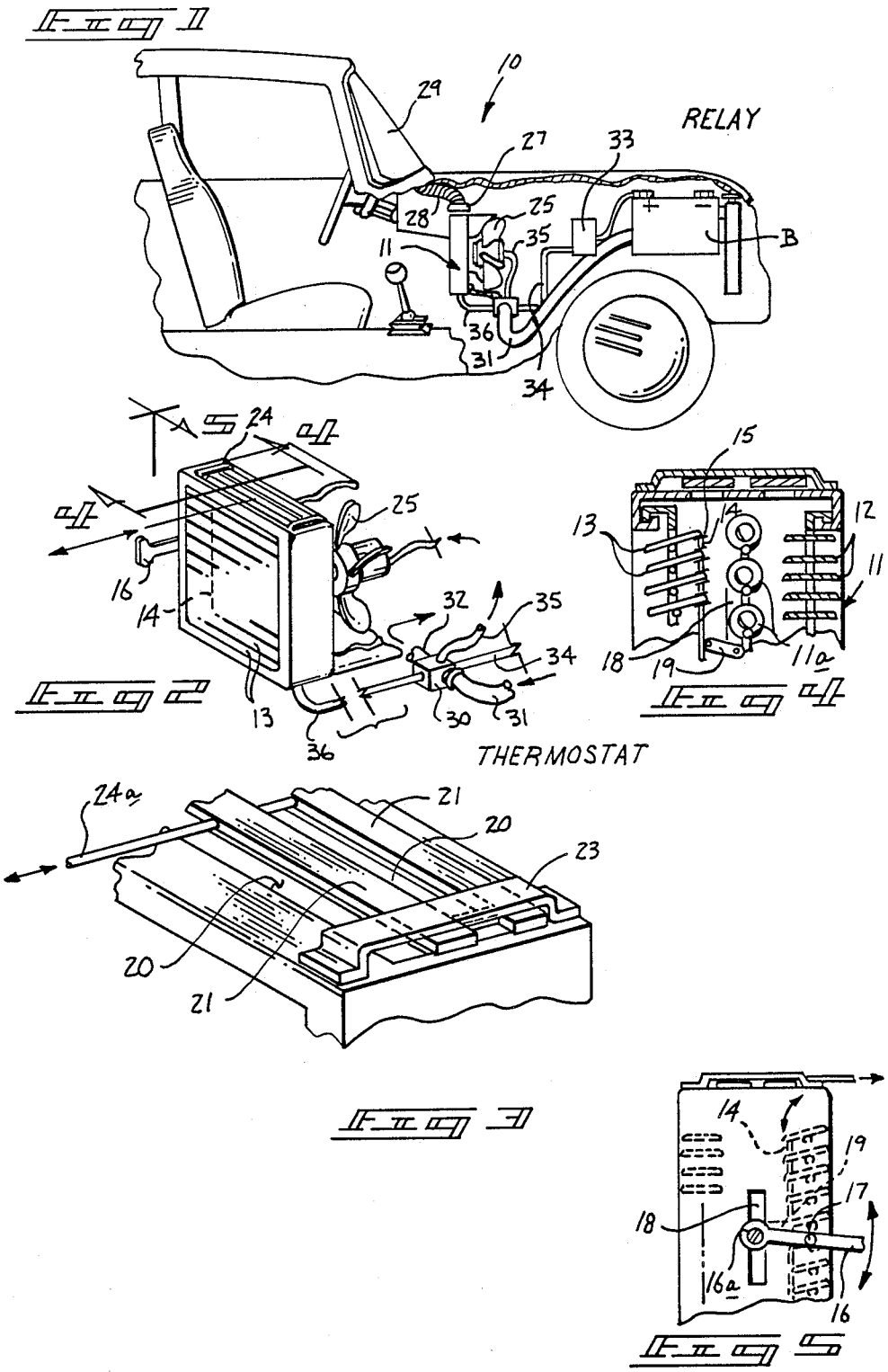

AUTOMOTIVE HEATING AND DEFROSTING APPARATUS

BACKGROUND OF THE INVENTION

1. Field of the Invention

The field of invention relates to automotive heaters, and more particularly pertains to a new and improved automotive heating and defrosting apparatus wherein the same directs selective heat to an interior portion of an automotive compartment, as well as the interior surface of a windshield in response to coolant temperature of the associated automobile.

2. Description of the Prior Art

The use of automotive heaters, and particularly auxiliary automotive heaters, is well known in the prior art. Heretofore the automotive heaters of the prior art have utilized the liquid coolant of the automotive system to direct auxiliary heat interiorly of the automotive compartment, or alternatively have utilized electric heaters that, however, have not functioned in response to need, as directed by the instant invention in associating actuation of the instant invention in response to coolant temperature. For example, U.S. Pat. No. 4,700,888 to Samulak sets forth an auxiliary automotive heater utilizing liquid coolant from the engine to provide a heating medium wherein the liquid coolant is heated and pumped in response to predetermined conditions by an auxiliary heater and pump within the system.

U.S. Pat. No. 4,678,982 to Offiler, et al., sets forth a supplemental automotive heating system utilizing a step-down transformer coupled to the alternator stator windings of the vehicle to provide heat to an electrical heating coil.

U.S. Pat. No. 4,398,081 to Moad sets forth an additional automotive heater utilizing an auxiliary heater and pump that will heat the coolant of the automobile engine in a similar fashion as set forth by the Samulak organization.

U.S. Pat. No. 4,591,691 to Badali sets forth an additional example of an auxiliary automotive heating system utilizing the coolant system to direct a heating medium to the auxiliary automotive heater.

U.S. Pat. No. 3,264,450 to Wallace utilizes a resistance heater within the automotive environment coupled to the electrical generating system of the automobile.

As such, it may be appreciated that there is a continuing need for a new and improved automotive heating and defrosting apparatus that directs itself to the problems of providing selective heat to the interior passenger compartment as well as to the automotive defrosting system and for linking the operation of the system to the coolant temperature of the engine coolant associated with the automobile engine and in this respect, the present invention substantially fulfills this need.

SUMMARY OF THE INVENTION

In view of the foregoing disadvantages inherent in the known types of auxiliary automotive heating systems now present in the prior art, the present invention provides an automotive heating and defrosting apparatus wherein the same provides selective heat through a defrosting system as well as to the interior passenger compartment in response to a depressed liquid coolant temperature of the associated automobile's engine. As such, the general purpose of the present invention, which will be described subsequently in greater detail, is to provide a new and improved automotive heating and defrosting apparatus which has all the advantages of the prior art auxiliary automotive heaters and none of the disadvantages.

To attain this, the automotive heating and defrosting apparatus of the instant invention includes an electrical resistance heater housing utilizing a series of electrical resistance coils and rearwardly mounted series of louvres to direct laminae air flow interiorly of the housing with pivotally mounted louvres forwardly of the housing and slidable louvres overlying the housing to selectively direct heated air interiorly of the passenger compartment or to a defroster system in conjunction with a forced air system utilizing a fan and a shroud overlying the fan to pressurize the interior portion of the housing. A thermostatic control will direct electrical current to the resistance heating elements, as well as the electrical fan in response to a depressed coolant temperature.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of &he present invention Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive heating and defrosting apparatus which has all the advantages of the prior art and none of the disadvantages.

It is another object of the present invention to provide a new and improved automotive heating and defrosting apparatus which may be easily and efficiently manufactured and marketed.

It is a further object of the present invention to provide a new and improved automotive heating and defrosting apparatus which is of a durable and reliable construction.

An even further object of the present invention is to provide a new and improved automotive heating and defrosting apparatus which is susceptible of a low cost of manufacture with regard to both materials and labor, and which accordingly is then susceptible of low prices of sale to the consuming public, thereby making such automotive heating and defrosting apparatus economically available to the buying public.

Still yet another object of the present invention is to provide a new and improved automotive heating and defrosting apparatus which provides in the apparatuses and methods of the prior art some of the advantages thereof, while simultaneously overcoming some of the disadvantages normally associated therewith.

Still another object of the present invention is to provide a new and improved automotive heating and defrosting apparatus wherein the same responds to depressed levels of automotive coolant temperature to direct heated air selectively to an interior passenger compartment as well as to the interior surface of an automotive windshield to effect heating and defrosting of the interior portion of the automotive compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view taken in elevation, partially in section, of the interior portion of an automobile and the heating and defrosting apparatus positioned therewithin.

FIG. 2 is an isometric illustration of the heater housing and fan organization.

FIG. 3 is an isometric illustration of the top mounted louvres associated with a heater housing.

FIG. 4 is an orthographic view taken along &he lines 4—4 of FIG. 2 in the direction indicated by the arrows.

FIG. 5 is an orthographic view taken along the section line 5 of FIG. 2 in the direction indicated by the arrows.

DESCRIPTION OF THE PREFERRED EMBODIMENT

With reference now to the drawings, and in particular to FIGS. 1 to 5 thereof, a new and improved automotive heating and defrosting apparatus embodying the principles add concepts of the present invention and generally designated by the reference numeral 10 will be described.

More specifically, the automotive heating and defrosting apparatus of the instant invention essentially comprises an electrical resistance heater housing 11 containing a series of electrical resistance heating coils 11a wound throughout the interior of the housing and aligned parallel to the forward and rear faces of the housing. The rear face of the housing includes a coextensive series of fixed parallel rear louvres 12 directed orthogonally through the rear face of the housing with a series of pivotally mounted forward louvres 13 mounted for pivotment between an opened and closed position through a forward face of the housing. An actuator rod 14 secures each of the pivotally mounted louvres 13 proximate a rear end thereof and is contained and positioned relative to each louvre by a plurality of positioning washers 15 fixedly secured to the actuator rod 14 and sandwiching an associated louvre 13 therebetween. A control rod 16 is pivotally mounted at a pivot mount 17 adjacent the forward face of the housing on the side of the housing with a rear terminal end 16a vertically positionable through a control slot 18 through the side of the housing with a control link 19 secured to the actuator rod 14 whereupon pivoting of the control rod 16 effects an opening and closing of the forward louvres 18 to control airflow through the louvres 13 and into the passenger compartment of the automobile. The housing 11 further includes a series of slidably mounted top louvres 20 formed of a predetermined width slidably arranged over a like number of top slots 21 of an equal predetermined width whereupon a rearward sliding of the top louvres 20 selectively closes and opens the top slots 21 to determine airflow through an associated hood 27 and into an associated defroster duct 28 to direct air onto the interior surface of the windshield 29 of the automobile. The top louvres 20 are secured by a first brace 23 proximate a first terminal end of each of the top louvres 20 wherein the first brace is arranged orthogonally relative to the first terminal ends of the louvres with a second brace 24 arranged proximate the second end of each of the top louvres 21 and wherein the louvres formed with a handle extension 24a extending outwardly and orthogonally relative to the forward face of the housing.

Positioned adjacent the rear face of the housing is a pressurizing fan 25 positioned within a fan shroud 26 that is directed outwardly of the rear face of the housing to direct air through the fixed louvres 12 and selectively through the forward pivotally mounted louvres 13 or the slidingly mounted top louvres 20.

Control of the resistance heating coils 11a and the fan 25 is effected through the thermostat 30 positioned within a conduit circuit of coolant of the automobile engine. Particularly an inlet conduit 31 directs coolant fluid from the engine into the thermostat 30 with an outlet conduit 32 directing coolant fluid from the thermostat back to the engine block The conduit 31 may be selectively spliced into an existing heater hose of the associated automobile utilizing the conventional water pump of the automobile engine to direct pressurized coolant fluid through the inlet and outlet 31 and 32 respectively. The thermostat 30 receives electrical energy through a first electrical line 34 associated between the thermostat 30 and a conventional relay 33 to direct stepdown voltage from the battery "B" to the thermostat 30. Prior to the thermostat 30 attaining a predetermined temperature dependent upon the temperature of the coolant flow through the conduit lines 31 and 32, electrical energy is directed through the relay 33, to the thermostat 30, and to a second electrical line 35 directing electrical energy to the fan motor 25 and through a third coils 11a within the housing 11. The electrical energy directed from the battery "B" to the relay 33 is provided through a fourth electrical line 37, as illustrated in FIG. 1. Upon the coolant within the respective inlet and outlet conduits 31 and 32 obtaining a predetermined temperature, the thermostat will deenergize the fan 25 and the heating coils 11a and thereby allow the existing engine coolant heater to warm the interior of the automobile in a conventional fashion.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is a follows:

1. An auxiliary automotive heater system in combination with a self-propelled vehicle wherein said vehicle includes a liquid coolant to cool an internal combustion engine, an electrical storage battery and a passenger compartment with a forwardly mounted windshield, said heater system comprising:

a heater housing including a forward face, a rear face, a top wall, and spaced first and second side walls wherein said housing is mounted adjacent said passenger compartment, said housing including an elongate electrical heating coil therein arranged parallel to said forward and rear faces of said housing, and pivotally mounted forward louvres defining the forward face of the housing, and top louvres movably mounted to the top-wall of the housing, and fan means positioned adjacent to the rear face of the housing to direct air into said housing and selectively through said forward louvres and said top louvres, and thermostat means communicating with said liquid coolant to energize said fan means and said electrical heating coil prior to said liquid coolant attaining a predetermined temperature, and including rear louvres arranged orthogonally through and defining the rear face of the housing wherein the rear louvres are stationary to direct laminae airflow interiorly of said housing, and said forward louvres include a control rod, and said control rod is directed rearwardly of each of said forward louvres and includes a plurality of washers associated with each louvre to sandwich each louvre between each pair of washers to maintain said control rod relative to said forward louvres, and further including a control handle pivotally mounted to a first side of said housing and operative through a slot arranged through the first side of said housing and associated with said control rod to pivot said louvres from an opened to a closed position, and the top wall of the housing includes a plurality of top slots of a predetermined width and wherein the top louvres are of a width equal to the predetermined width, and the top louvres are slidably arranged relative to the top slots, and each end of each top louvre is positioned within a track to maintain the top louvres in a predetermined orientation relative to the top slots, and further including a first brace directed orthogonally to and integrally secured to each of the top louvres and including a spaced parallel second brace relative to the first brace wherein the second brace includes handle extension directed outwardly of the forward face of the housing to enable manual reciprocation of the top louvres relative to the top slots.

2. An auxiliary automotive heater system as set forth in claim 1 further including a fan shroud directed rearwardly of the rear louvres and encompassing the fan means to direct air from the fan means interiorly of the housing.

3. An auxiliary automotive heater system as set forth in claim 2 further including a hood overlying the top louvres, and the hood in communication with a duct, and the duct terminating adjacent an interior surface of the windshield to direct heater air to the interior surface of the windshield.

4. An auxiliary automotive heater system as set forth in claim 3 wherein the thermostat means includes a relay, and the relay is in direct electrical communication with the battery to direct a step-down voltage to the thermostat means.

5. An auxiliary automotive heater system as set forth in claim 4 including an inlet conduit directed into said thermostat means to direct engine coolant from said engine to said thermostat means, and an outlet conduit to direct engine coolant from said thermostat means to the engine of the vehicle.

* * * * *